(12) United States Patent
Barbone et al.

(10) Patent No.: US 11,518,111 B2
(45) Date of Patent: Dec. 6, 2022

(54) WELD SEAM TESTING CHAIN

(71) Applicant: Georg Fischer Rohrleitungssysteme AG, Schaffhausen (CH)

(72) Inventors: Riccardo Barbone, Schaffhausen (CH); Joerg Wermelinger, Schaffhausen (CH)

(73) Assignee: Georg Fischer Rohrleitungssysteme AG, Schaffhausen (CH)

( * ) Notice: Subject to any disclaimer, the term of this patent is extended or adjusted under 35 U.S.C. 154(b) by 123 days.

(21) Appl. No.: 17/069,053

(22) Filed: Oct. 13, 2020

(65) Prior Publication Data
US 2021/0129452 A1 May 6, 2021

(30) Foreign Application Priority Data

Oct. 30, 2019 (EP) ..................... 19206211

(51) Int. Cl.
*G01N 29/04* (2006.01)
*B29C 65/82* (2006.01)

(52) U.S. Cl.
CPC ......... *B29C 65/8292* (2013.01); *G01N 29/04* (2013.01); *G01N 2291/0235* (2013.01); *G01N 2291/2675* (2013.01)

(58) Field of Classification Search
CPC . B29C 65/8292; B29C 65/02; B29C 66/1142; B29C 66/5221; G01N 29/04; G01N 29/225; G01N 29/265; G01N 29/041; G01N 2291/0235; G01N 2291/2675; G01N 2291/2634; G01N 2291/267
See application file for complete search history.

(56) References Cited

U.S. PATENT DOCUMENTS

| | | | |
|---|---|---|---|
| 4,844,396 A | 7/1989 | Norton | |
| 5,824,908 A | 10/1998 | Schindel et al. | |
| 9,255,641 B2 | 2/2016 | Raible et al. | |
| 10,179,437 B2 | 1/2019 | Wermelinger et al. | |
| 2007/0151364 A1* | 7/2007 | Wiest | G01F 1/663 |
| | | | 73/861.27 |
| 2012/0204645 A1* | 8/2012 | Crumpton | G01N 29/043 |
| | | | 73/588 |

FOREIGN PATENT DOCUMENTS

| | | | |
|---|---|---|---|
| CN | 110031549 A | 7/2019 | |
| KR | 101645977 B1 | 8/2016 | |
| WO | WO-0196808 A2 * | 12/2001 | ............. G01B 17/02 |

* cited by examiner

*Primary Examiner* — Suman K Nath
(74) *Attorney, Agent, or Firm* — Harness, Dickey & Pierce, P.L.C.

(57) ABSTRACT

Weld seam testing chain for testing a weld seam by means of ultrasound on two plastic tubes welded together at the ends, comprising standard chain links, wherein the standard chain links are hooked together to form the weld seam testing chain, and the chain can be lengthened or shortened individually, a sensor receptacle for accommodating the ultrasonic sensor, and an adjusting unit for the fine adjustment of the weld seam testing chain length, wherein the standard chain links have a hook on one side and a hook receptacle on the opposite side, thereby enabling the individual chain links to be hooked together.

10 Claims, 7 Drawing Sheets

WELD SEAM TESTING CHAIN

CROSS-REFERENCE TO RELATED APPLICATIONS

This application claims the benefit and priority of European Patent Application No. 19 206 211.5 filed Oct. 30, 2019. The entire disclosure of the above application is incorporated herein by reference.

BACKGROUND OF THE INVENTION

1. Field of the Invention

The invention relates to a weld seam testing chain for testing a weld seam by means of ultrasound on two plastic tubes welded together at the ends, comprising standard chain links, wherein the standard chain links are hooked together to form the weld seam testing chain, and the chain can be lengthened or shortened individually, a sensor receptacle for accommodating the ultrasonic sensor, and an adjusting unit for the fine adjustment of the weld seam testing chain length.

2. Discussion

By means of the chain, the ultrasonic sensor is rotated around the circumference of the pipeline and tests the weld seam over the entire circumference by means of ultrasound without rotation of the tube itself and without destroying it.

The non-destructive analysis of test objects by means of ultrasound is prior art and is used in many sectors, e.g. in aircraft construction.

This method is employed principally with metallic materials since they have good sound conduction properties.

The purpose of ultrasonic testing is to find internal and external defects that could not be detected without destroying the test object.

U.S. Pat. No. 5,824,908 discloses a test method of this kind which can detect defects in materials on the basis of ultrasound waves.

However, the disadvantage with the method disclosed is that the system can be applied only to plates and only to materials which have a certain uniformity without any structural change in the material.

CN 110031549 A1 discloses a device for checking the weld seam of tubes that have been welded together.

The disadvantage with this embodiment is that it has a large number of individual parts that are screwed together, which entails complex mounting of the chain on the tube and, owing to the large number of rollers, the chain tends to become contaminated and is very maintenance-intensive.

SUMMARY OF THE INVENTION

It is an aspect of the invention to propose a weld seam testing chain which allows simple mounting of an ultrasonic testing device or of a transmitter and receiver of such a device for the purpose of testing weld seams on welded plastic pipelines and which can be adapted to different tube diameters with little effort and is also simple to maintain.

According to the invention, this aspect is achieved by virtue of the fact that the standard chain links have a hook on one side and a hook receptacle on the opposite side, thereby enabling the individual chain links to be hooked together.

The weld seam testing chain according to the invention for testing a weld seam by means of ultrasound on two plastic tubes welded together at the ends comprises a plurality of standard chain links. The standard chain links are hooked together to form the weld seam testing chain. The chain can be lengthened or shortened individually by adding or removing standard chain links in the weld seam testing chain and, as a result, can be used for different tube diameters. The weld seam testing chain has a sensor receptacle for receiving the ultrasonic sensor or the transmitter and receiver of the ultrasonic sensor. For the fine adjustment of the weld seam testing chain length, the weld seam testing chain according to the invention has an adjusting unit. On one side, the standard chain links which are hooked together have a hook and, on the opposite side, have a hook receptacle. By virtue of the connection by means of a hook and hook receptacle, it is a simple matter to connect the standard chain links to one another or to release them from one another, and this allows rapid adaptation of the chain length.

It has proven advantageous if the standard chain links are produced as 3-D printed parts, preferably from a polymer. Of course, other production methods are also conceivable, wherein the standard chain links are preferably composed of plastic.

The standard chain link preferably has bearing surfaces on the side of the hook receptacle, wherein the bearing surfaces are designed as radii so as to rest directly against the outer shell of the welded tube. As a result, there is only a linear bearing surface between the standard chain links and the tube outer shell, thereby enabling the chain to rotate easily and to rest well on the outside diameter, irrespective of the tube dimension.

It has proven advantageous if the standard chain link is of one-piece design and rests directly on the outer shell of the welded tube. By virtue of the one-piece design of the standard chain link and the bearing surfaces which are designed as radii, it is possible to dispense with separate rollers. The standard chain link preferably has a fork-shaped configuration, preferably with two arms, on the side of the hook receptacle.

The bearing surfaces of the standard chain link are preferably arranged rigidly and integrally on the standard chain link. It is advantageous if the bearing surfaces are arranged on the two arms of the fork-shaped side of the hook receptacle.

A preferred embodiment has proven to be one in which the adjusting unit of the weld seam testing chain according to the invention has two adjusting elements, which can be moved relative to one another. The adjusting elements preferably engage in one another and can be adjusted continuously and locked by means of a screw.

It has proven advantageous if the sensor receptacle is designed as a chain link. This enables the sensor receptacle to be arranged with little effort on the standard chain links, the adjusting unit, the holder for an angle sensor, or an element corresponding to the connection possibilities of the chain links.

A preferred embodiment has proven to be one in which the lead wedges for receiving the ultrasonic sensor are arranged on the sensor receptacle, wherein the lead wedges are arranged adjustably on the sensor holder. Two lead wedges are preferably arranged on the sensor receptacle, wherein one accommodates the transmitter and the other accommodates the receiver of the ultrasonic sensor.

A clamping system is preferably arranged on the sensor receptacle, wherein the clamping system exerts a constant contact pressure on the lead wedges, which rest on the outer shell of the tube. It has proven advantageous if the clamping system is formed by spring elements which press the lead wedges against the circumferential surface of the tube, wherein the spring elements preferably also serve to position the lead wedges on the sensor receptacle, and the lead wedges can preferably be arranged in an adjustable manner.

It is advantageous if the lead wedges have an outer housing and an inner element. The outer housing and the inner element preferably comprise different materials. PTFE has proven to be an advantageous material in ultrasonic tests, for which reason the inner element is preferably produced from PTFE.

The weld seam testing chain according to the invention preferably has a holder for securing an angle sensor, wherein the holder is designed as a chain link. This likewise allows easy installation in the weld seam testing chain or on the standard chain links or the other links that are of appropriate design for adaptation to the chain.

BRIEF DESCRIPTION OF THE DRAWINGS

An illustrative embodiment of the invention is described with reference to the figures, although the invention is not restricted to the illustrative embodiment.

DESCRIPTION OF THE PREFERRED EMBODIMENTS

Figure 1:
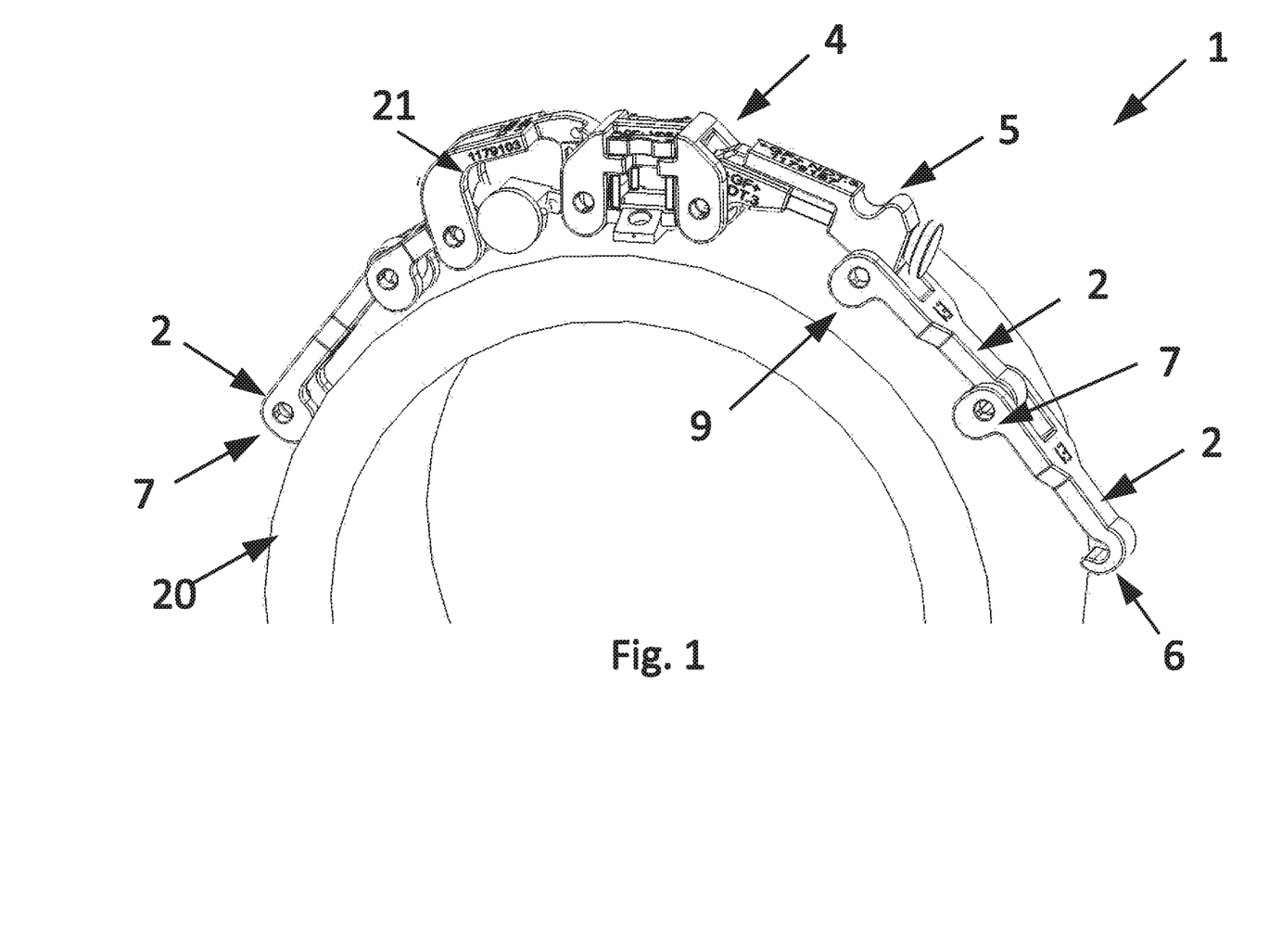
FIG. 1 shows a three-dimensional illustration of a section of the weld seam testing chain according to the invention on the tube.

The weld seam testing chain 1 according to the invention illustrated in FIG. 1 for testing weld seams on butt-welded plastic tubes comprises standard chain links 2, wherein the standard chain links 2 are connected to one another simply by being hooked together. The chain can be lengthened or shortened as desired by hooking in and unhooking standard chain links. For this purpose, the standard chain links 2 have a hook 6 on one side and a hook receptacle 7 on the other side. The weld seam testing chain 1 according to the invention likewise has a sensor receptacle 4 for receiving the ultrasonic sensor or the transmitter and receiver of the ultrasonic sensor. For the precise adjustment of the length of the weld seam testing chain 1, the chain 1 comprises an adjusting unit 5.

The standard chain links 2 have bearing surfaces 9 on the side of the hook receptacle 7, wherein the bearing surfaces 9 are formed by radii 8 arranged integrally on the standard chain link 2. By virtue of the radii 8, which rest directly on the shell circumference of the tube, there is only a linear bearing surface 9, thereby ensuring that the chain according to the invention rests well on the outer shell and can also be rotated easily around the circumference. The bearing surfaces 9 are arranged integrally and thus also rigidly on the one-piece standard chain link 2. The radii 8 on the standard chain link 2 form a projecting nose on the side of the hook receptacle 7, preferably to provide a pin (not illustrated) into which the hook 6 is hooked. The projecting nose also serves to ensure that the standard chain link 2 is spaced apart from the outer shell of the tube 20 or rests exclusively by means of the bearing surface 9 on the outer shell.

The hook receptacle 7 is preferably of fork-shaped design and has two arms 12, between which the hook 6 is hooked in, wherein a pin (not illustrated) extends between the arms 12, wherein the pin is arranged as a separate part or likewise integrally on the standard chain link 2.

Figure 3:
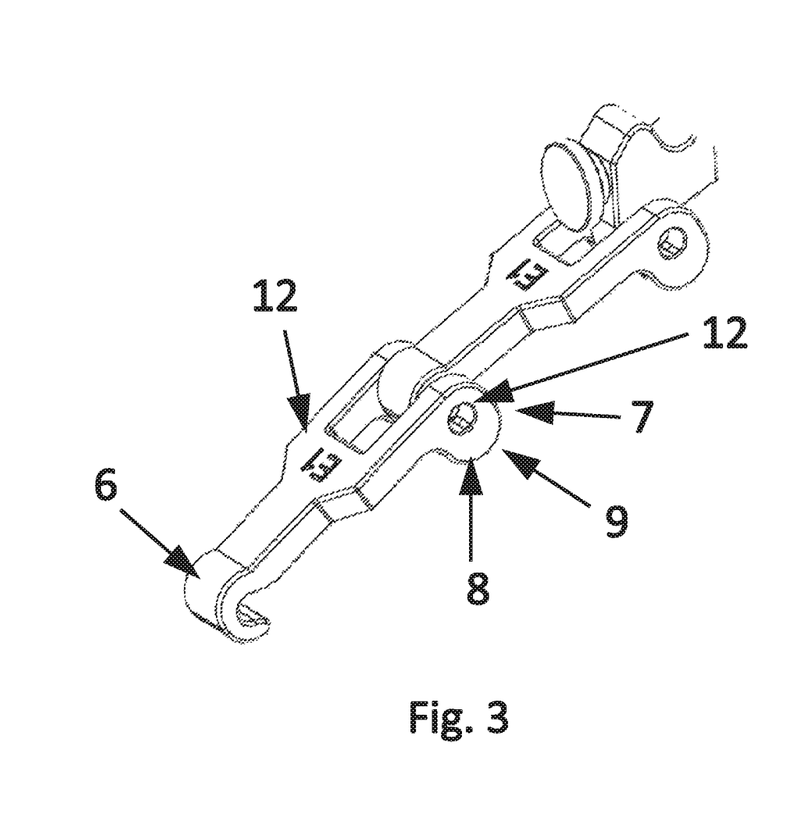
FIG. 3 shows a three-dimensional illustration of two standard chain links that are hooked together.
Figure 4:
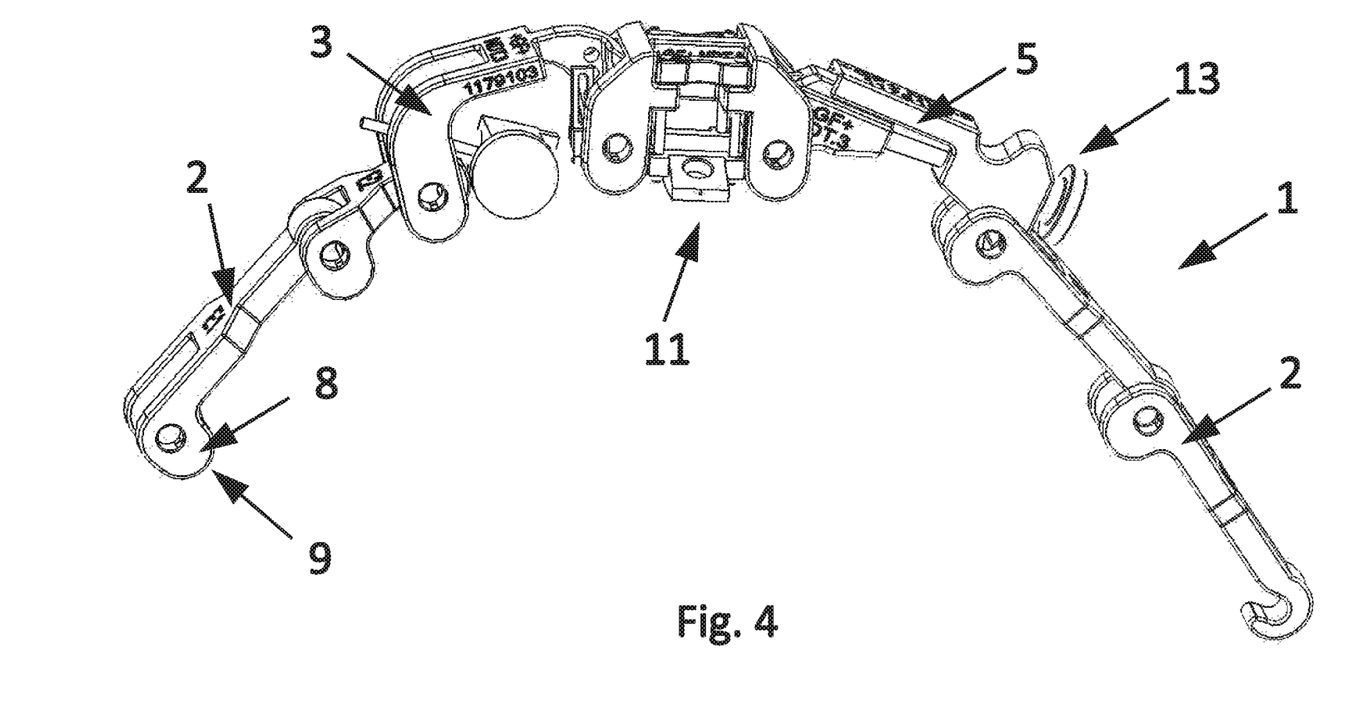
FIG. 4 shows a three-dimensional illustration of a section of the weld seam testing chain according to the invention.

As is readily apparent in FIG. 3, the standard chain link 2 is of one-piece design, preferably composed of plastic and, as a special preference, produced by 3-D printing.

Figure 2:
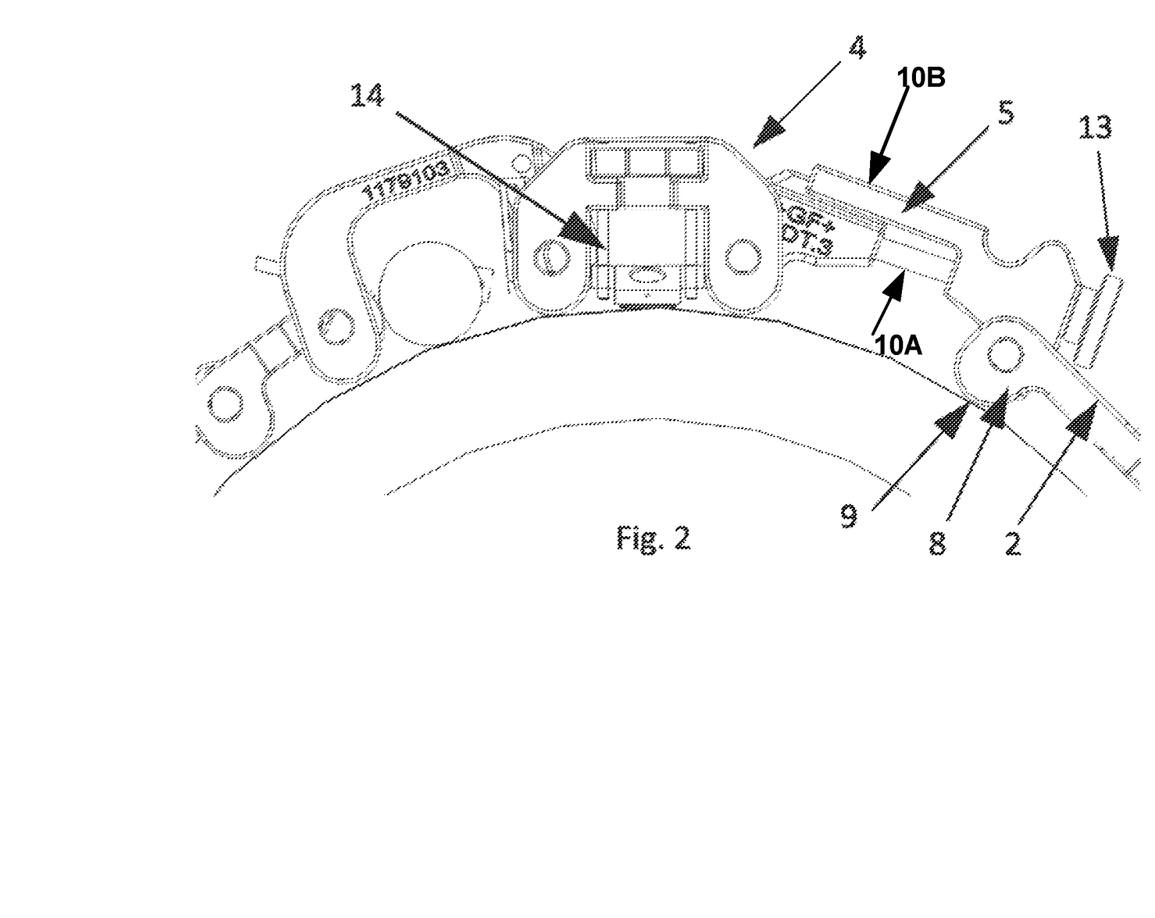
FIG. 2 shows a plan view of the weld seam testing chain according to the invention in the region of the sensor receptacle.
Figure 5:
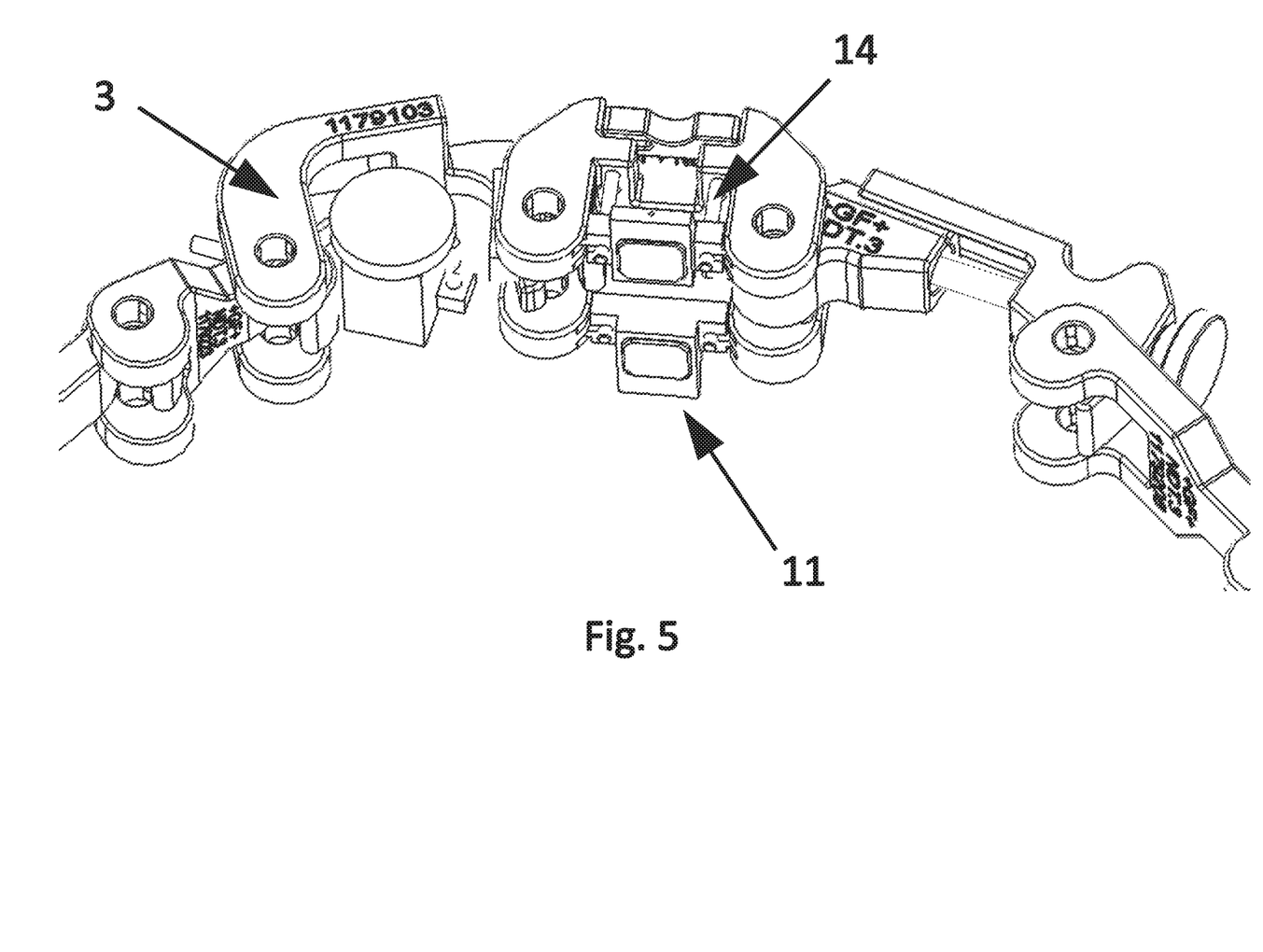
FIG. 5 shows a three-dimensional illustration of a section of the weld seam testing chain according to the invention from below.
Figure 6:
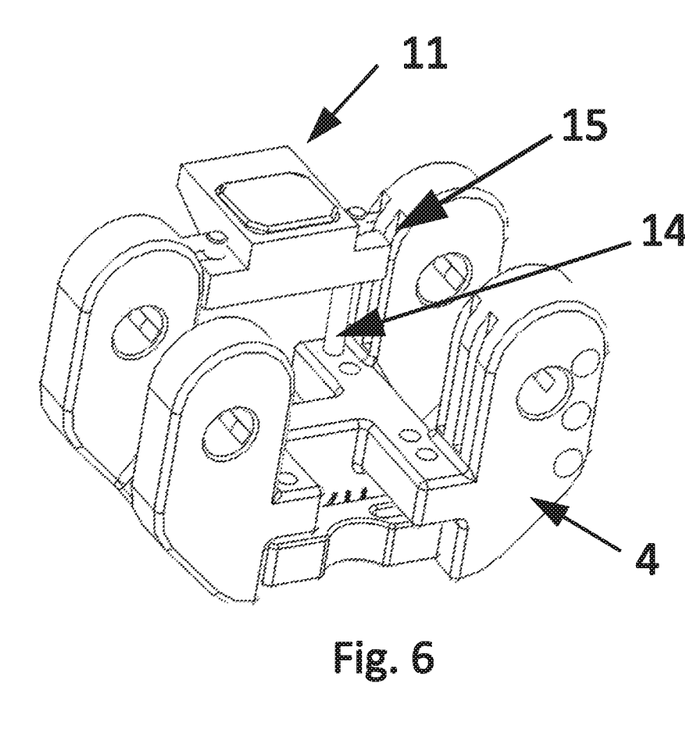
FIG. 6 shows a three-dimensional illustration of a sensor receptacle from below.
Figure 7:
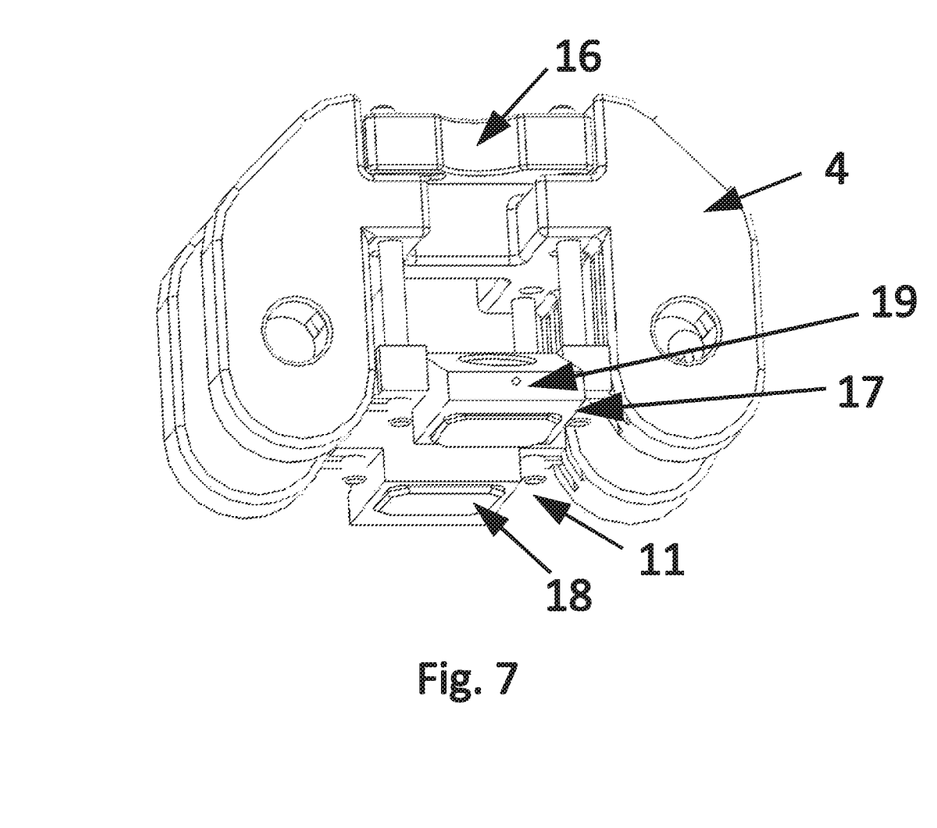
FIG. 7 shows a three-dimensional illustration of a sensor receptacle.

In FIG. 2, it is possible to see the other elements of the weld seam testing chain 1 according to the invention, such as the adjusting unit 5, which preferably comprises two adjusting elements 10A, 10B that can be moved relative to one another. By means of an adjusting screw 13, the length of the chain 1 can then be adjusted with appropriate accuracy. To ensure that testing of the weld seam has taken place over the entire circumference, it is advantageous to provide an angle sensor 21 on the chain 1. In order to secure said sensor on the chain 1, one chain link is designed as a holder 3 for an angle sensor and has appropriate fastening possibilities. The holder 3 and also the sensor receptacle 4 and the adjusting unit 5 are designed in such a way at the ends thereof that they can be adapted easily to the standard chain links 2 since they have the same ends and are thus compatible. FIG. 5 shows the chain 1 according to the invention from below, thereby clearly showing the lead wedges 11 that accommodate the transmitter and receiver of the ultrasonic sensor. The lead wedges 11 are arranged in the sensor receptacle 4 in a manner which allows adjustment by means of a guide 15. The lead wedges 11 are preferably pressed onto the circumferential surface of the tube 20 by means of a clamping system 14 to enable optimum ultrasonic testing to be performed. For this purpose, spring elements are preferably used (not illustrated). This is advantageous if a safety clip 16 secures the lead wedges in the sensor receptacle 4. Moreover, the lead wedges 11 are preferably arranged so as to be adjustable relative to one another, allowing different widths of weld seams to be tested, wherein the adjustment is provided continuously or with predetermined positions.

The lead wedges 11 have an outer housing 17 and an inner element 18. By means of the two-part form, exchange when the inner elements are worn is simple to implement since the inner element is simply clipped into the outer housing 17. Moreover, the inner element 18 is preferably composed of PTFE, which is to be preferred for the transmission of the ultrasound waves. Moreover, ventilation is achieved by means of a hole 19 in the outer housing 17.

What is claimed is:

1. A weld seam testing chain for testing a weld seam by means of ultrasound on two plastic tubes welded together at the ends, comprising standard chain links, wherein the standard chain links are hooked together to form the weld seam testing chain, and the chain can be lengthened or shortened individually, an ultrasonic sensor, a sensor receptacle for accommodating the ultrasonic sensor, and an adjusting unit for the fine adjustment of the weld seam testing chain length, wherein the standard chain links have a hook on one side and a hook receptacle on the opposite side, thereby enabling the individual chain links to be hooked together; and said chain being configured to rotate to carry the ultrasonic sensor around the entire circumference of weld seam to test the weld seam without rotating the tubes or destroying the tubes.

2. The weld seam testing chain according to claim 1, wherein the standard chain link has bearing surfaces on the side of the hook receptacle, wherein the bearing surfaces are designed as radii and rest directly against the outer shell of the welded tube.

3. The weld seam testing chain according to claim 1, wherein the standard chain link is of one-piece design and rests directly on the outer shell of the welded tube.

4. The weld seam testing chain according to claim 2, wherein the bearing surfaces of the standard chain links are arranged rigidly and integrally on the chain link.

5. The weld seam testing chain according to claim 1, wherein the adjusting unit has two adjusting elements, which can be moved relative to one another.

6. The weld seam testing chain according to claim 1, wherein the sensor receptacle is designed as a chain link.

7. The weld seam testing chain according to claim 1, wherein lead wedges for receiving the ultrasonic sensors are arranged on the sensor receptacle, wherein the lead wedges are arranged adjustably on the sensor holder.

8. The weld seam testing chain according to claim 7, wherein a clamping system is arranged on the sensor receptacle, wherein the clamping system exerts a constant contact pressure on the lead wedges, which rest on the outer shell of the tube.

9. The weld seam testing chain according to claim 7, wherein the lead wedges have an outer housing and an inner element.

10. The weld seam testing chain according to claim 1, wherein a holder for securing an angle sensor is arranged in the weld seam testing chain, wherein the holder is designed as a chain link.

* * * * *